United States Patent
Norris

(10) Patent No.: US 7,436,894 B2
(45) Date of Patent: Oct. 14, 2008

(54) METHOD AND APPARATUS FOR EFFICIENT BANDWIDTH COMMUNICATION

(75) Inventor: James Anthony Norris, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 758 days.

(21) Appl. No.: 10/694,082

(22) Filed: Oct. 28, 2003

(65) Prior Publication Data

US 2005/0089110 A1    Apr. 28, 2005

(51) Int. Cl.
*H04L 23/02* (2006.01)

(52) U.S. Cl. ...................................... 375/261
(58) Field of Classification Search ................. 375/261, 375/341, 295, 262; 714/786, 794, 795
See application file for complete search history.

(56) References Cited

U.S. PATENT DOCUMENTS 6,944,206 B1 * 9/2005 Dent ........................... 375/144

2002/0168026 A1 * 11/2002 Khoini-Porfard ........... 375/303
2003/0128656 A1 * 7/2003 Scarpa ........................ 370/203

OTHER PUBLICATIONS

John B. Anderson, Tor Aulin, and Carl-Erik Sunderberg, "Digital Phase Modulation," Jan. 1986, pp. 50-52.

* cited by examiner

*Primary Examiner*—Khai Tran
(74) *Attorney, Agent, or Firm*—Duane Morris LLP

(57) ABSTRACT

A method and apparatus for improving the bandwidth efficiency of a constant envelope continuous phase modulation waveform and transmitting data in a bandwidth efficient manner is disclosed. The method and apparatus utilizes a non-constant envelope continuous phase modulation signal which possesses many of the advantages of a multiple modulation index continuous phase modulation signal. One such advantage is the natural trellis structure of a multiple modulation index continuous phase modulation signal. In comparison to a constant envelope continuous phase modulation waveform, the non-constant envelope continuous phase modulation signal possesses a reduced transmit signal spectra and may also be demodulated by a standard maximum likelihood demodulator without any loss of performance.

30 Claims, 4 Drawing Sheets

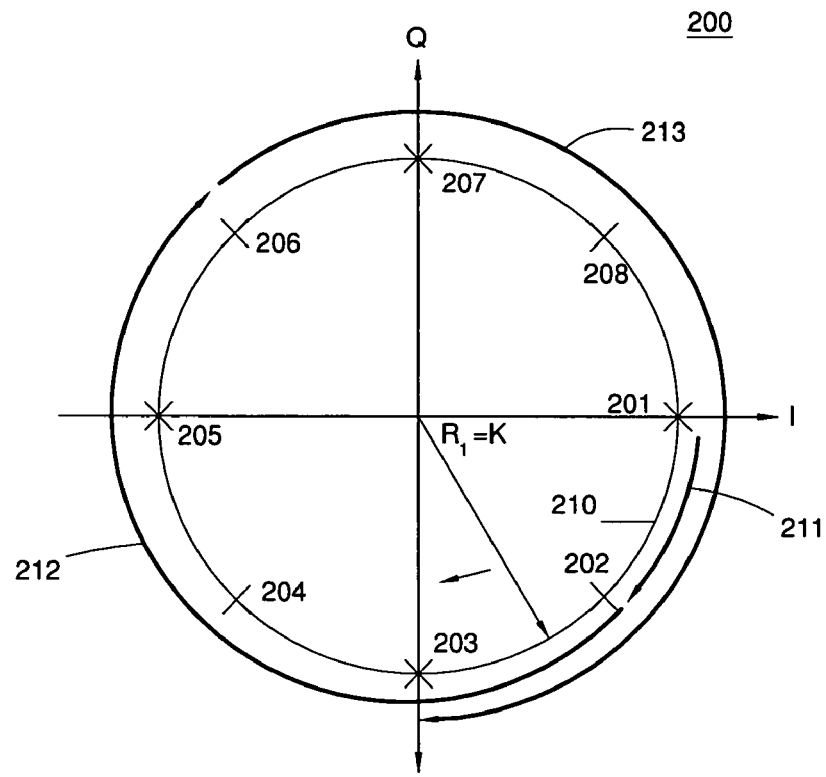
FIGURE 2a
PRIOR ART
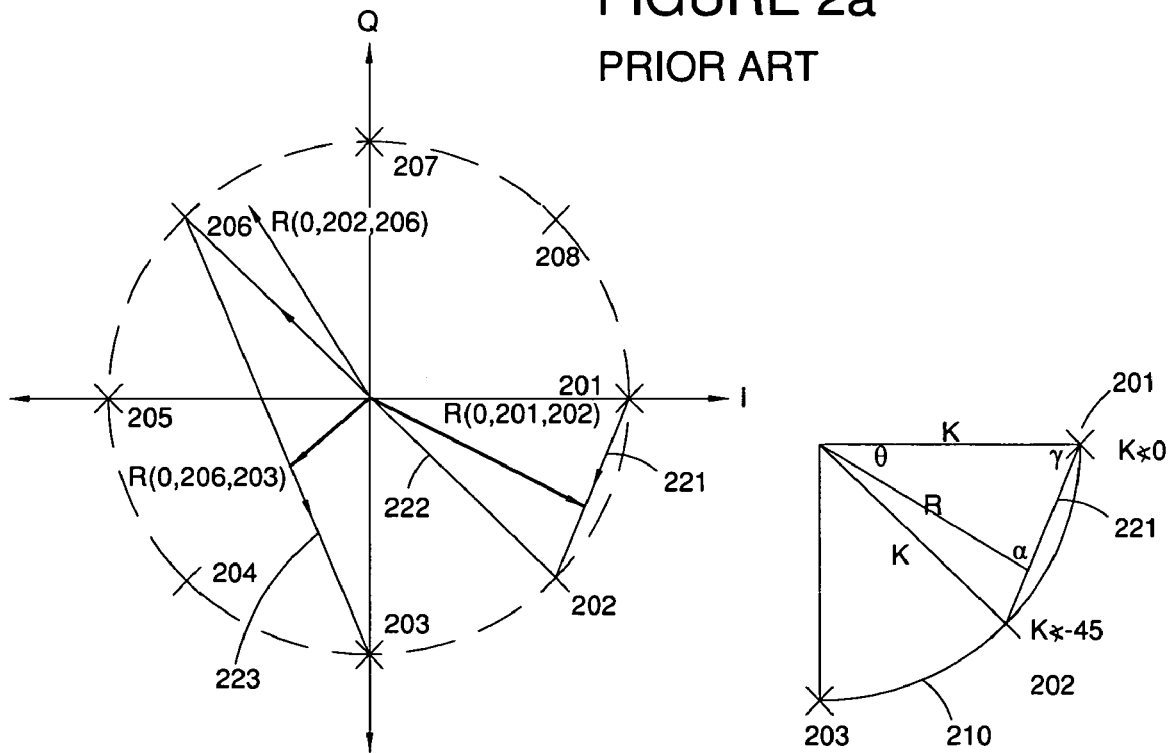
FIGURE 2b      FIGURE 2c

METHOD AND APPARATUS FOR EFFICIENT BANDWIDTH COMMUNICATION

BACKGROUND

This application is related to the field of digital communications and more specifically to communications systems that require waveforms which occupy a fixed bandwidth channel.

For digital transmission over band limited channels, the demand for bandwidth efficient signaling schemes has increased. A system often used for band limited channels is multi-bit per symbol phase shift keying (M-ary PSK) which has the drawback that for M equal to 2 or 4, the signal possesses a wide band because of discontinuous phase. Thus, radio frequency filtering has to be performed before transmission causing decreased receiver sensitivity. Other systems such as minimum shift keying (MSK) and fast frequency shift keying (FFSK) possess an error probability performance similar to 2- or 4-ary PSK but with a narrower spectrum for large frequencies. Choosing an M larger than 4 (e.g., M=8 or M=16) in the MPSK system makes the main lobe of the spectrum narrower, but increases the system's sensitivity to noise.

Continuous phase modulation (CPM) signals, as discussed in *Digital Phase Modulation* by Anderson, J., Aulin, T. and Sundberg, C. E., the entirety of which is herein incorporated by reference, have many advantages over phase shift keying (PSK) signals. PSK signals must be filtered and transmitted through linear amplifiers. After filtering, PSK signals have an amplitude variance that must be accounted for to prevent signal distortion and transmit power amplifier over-current. CPM signals do not possess this problem and may be transmitted at the maximum power level allowed by a radio power amplifier. To transmit at the same amount of power of the CPM signal, a PSK signal would require a power increase at the amplifier generally on the order of 4-5 dB. On the contrary, a non-constant envelope (NCE) CPM signal would require a power amplifier that only provided 1.2 dB more power. Any loss in bit error rate (BER) of the NCE-CPM signal with respect to the PSK signal may be compensated by the trade-off in power amplifier transmitted power.

Further improvements may be realized with NCE-CPM signals. For example, these signals may possess multiple modulation indices, h, which relate the size of the baseband pulse of a signal to the phase variation. A multi-h signal has a natural trellis structure that may be used to improve the modem BER performance without additional, redundant parity bits. Multi-h codes are phase codes in which the modulation index varies in a cyclic pattern from interval to interval. When this feature is added to an existing trellis encoder, a concatenated code results, in which trellis paths remain apart longer and minimum distance improves. This changes the modulation index of each symbol thereby delaying the point at which phase trajectories with different starting symbols remerge. This increases the minimum Euclidean distance (constraint length) and reduces the probability of symbol error. The cost for obtaining better detection efficiency through the use of a multi-h scheme is an increase in receiver complexity as compared to the single-h case. The optimum decoder for a trellis code in Gaussian noise is the Viterbi algorithm which traverses every path in the trellis structure to find the optimum path. An NCE-CPM waveform has both a reduced transmit signal spectra in comparison to a CPM waveform and the inherent CPM multi-h trellis structure which makes the NCE-CPM signal a better overall waveform for band limited channel communications. Furthermore, the NCE-CPM signal may be demodulated by a standard CPM maximum likelihood demodulator without any loss of performance. This allows an NCE-CPM signal a degree of interoperability with existing CPM demodulation capable receivers.

A performance summary of PSK, CPM and NCE-CPM waveforms is shown below in Table 1:

| Modulation | Power (Peak to Average) | Bandwidth | BER Performance |
|---|---|---|---|
| PSK | +4 dB to 5 dB | Base | 10-5 at 9.5 dB |
| CPM | unity | −25% | 10-5 at 8.5 dB |
| NCE-CPM | +1.2 dB | Same bandwidth as PSK | 10-5 at 12 dB |

It is therefore an object of the disclosure to present a method for improving the bandwidth efficiency of a CPM signal comprised of plural symbols. The method includes the steps of coding the data stream, modulating the data stream with a constant envelope CPM waveform and converting the constant envelope CPM waveform into an NCE-CPM waveform.

It is another object of the disclosure to present a method for improving the bandwidth efficiency of a constant envelope CPM waveform signal encoded with data symbols comprising the steps of varying a complex amplitude of a signal between successive constellation points prior to transmission and controlling the complex amplitude of the signal to follow a path between constellation points.

It is a further object of the disclosure to present a method of transmitting data as an NCE-CPM signal comprised of a plurality of symbols in a constellation. The method includes the steps of coding the plurality of symbols and transecting each symbol by direct path during modulation of the coded plurality of symbols.

It is still another object of the disclosure to present a method for modulating an input data stream comprised of a plurality of symbols represented as constellation positions in a complex plane. The method includes the steps of generating a CPM waveform modulated with the plurality of symbols and modifying the complex amplitude between the successive constellation positions to traverse the complex plane in a straight path from constellation position to constellation position.

It is an additional object of the disclosure to present a system for improving the bandwidth efficiency of a CPM waveform communication system. The system includes a transmitter for transmitting data as CPM symbols, a receiver with a constant envelope CPM demodulator, and a conversion means for converting a constant envelope CPM waveform to an NCE-CPM waveform prior to transmission such that the complex amplitude of the signal between successive constellation points is less than the complex amplitude at each of the constellation points.

It is an object of the disclosure to present a method for transmitting an input data stream as phase locations in a complex plane in a CPM waveform wherein the CPM waveform modulated with the input data stream transects the complex plan between successive phase locations in a substantially straight path.

It is also an object of the disclosure to present a method for communicating data wherein the data is transmitted as a plurality of symbols with a complex plane as a CPM waveform wherein the magnitude of the waveform in the complex plane varies between symbols.

These and many other objects and advantages of the present disclosure will be readily apparent to one skilled in the art to which the disclosure pertains from a perusal of the claims, the appended drawings, and the following detailed description of the preferred embodiments.

BRIEF DESCRIPTION OF THE DRAWINGS

The subject matter of the disclosure will be described with reference to the following drawings:

FIG. 2a is a representative constellation plot over a three symbol period of a prior art constant envelope continuous phase modulation (CPM) signal FIG. 2b is a representative constellation plot over the three symbol period of a non-constant envelope (NCE) CPM signal according to an embodiment of the disclosed subject matter.

FIG. 2c is a illustration of a transected path between two successive constellation point according to an embodiment of the disclosed subject matter.

Figure 1A:
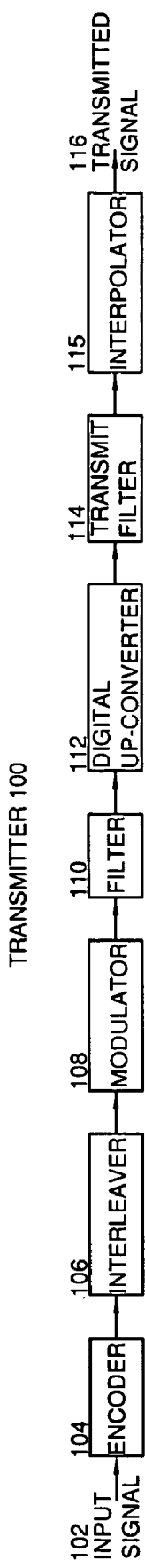
FIG. 1a illustrates a block diagram of a transmission system according to an embodiment of the disclosed subject matter used for transmitting data.

It is to be understood that these drawings are solely for the purposes of illustrating the concepts of the invention and are not intended as a definition of the limits of the invention. The embodiments shown in FIGS. 1a, 2b and 2c and described in the accompanying detailed description are to be used as illustrative embodiments and should not be construed as the only manner of practicing the invention. Also, the same reference numeral, possibly supplemented with reference characters where appropriate, have been used to identify similar elements.

DETAILED DESCRIPTION

A system and method for increasing bandwidth efficiency in a band limited channel is disclosed. A continuous phase modulated (CPM) signal may be represented as $$s(t, \alpha) = \sqrt{\frac{2E}{T}} \cos(2\pi f_0 t + \phi(t, \alpha) + \phi_o)$$

where the information carrying phase may be defined as $$\phi(t, \alpha) = 2\pi h \int_{-\infty}^{t} \sum_{i=-\infty}^{\infty} \alpha_i g(\tau - iT) d\tau; -\infty < t < \infty$$

where $\alpha = \ldots \alpha_{-2} \alpha_{-1} \alpha_0 \alpha_1 \ldots$ is an infinitely long sequence of uncorrelated M-ary data symbols each taking one of the values $\alpha_i = \pm 1, \pm 3, \ldots, \pm (M-1)$; $i=0, \pm 1, \pm 2, \ldots$ with equal probability of $1/M$. (M is assumed even).

E is the symbol energy, T is the symbol time, $f_0$ is the carrier frequency, and $\phi_o$ is an arbitrary constant phase shift which, without loss of generality, may be set to zero in the case of coherent transmission. "h" is referred to as the modulation index which relates the size of the baseband pulse $g(\tau)$ to the size of the phase variation $\phi(t, \alpha)$. The amplitude of $g(\tau)$ may be chosen to give a maximum phase change $\alpha\pi h$ radians over each symbol interval when all the data symbols in a sequence take the same value $\alpha$. The subject matter of the present disclosure is directed to a continuous phase frequency shift keying (CPFSK), notated 1REC, where the frequency pulse $g(\tau)$ is of rectangular length T.

The information carrying phase function in CPM signals is continuous at all times for all combinations of data symbols. In M-ary continuous phase frequency shift keying (CPFSK) schemes, the phase change is proportional to the slope of the continuous and piecewise linear phase, i.e., the modulation index h. In multi-h CPM and non-constant envelope (NCE) CPM schemes, the modulation index may be cyclically changed for successive symbol intervals. The cyclic use of properly chosen modulation indices essentially provides delayed merging of neighboring phase trellis paths which leads to an increase of minimum Euclidean distance (constraint length) and provides coding gain for multi-h phase coded modulation schemes.

Figure 1B:
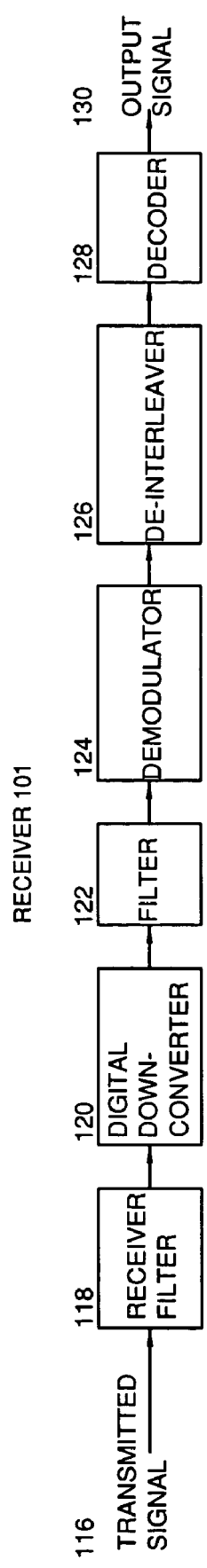
FIG. 1b illustrates a block diagram of a prior art receiver capable of receiving a signal transmitted according to an embodiment of the disclosed subject matter.

FIGS. 1a and 1b illustrate a novel transmitter 100 and a known CPM receiver 101, respectively. In such a communication system, an input signal 102 is applied to an encoder 104, which applies an error correcting code to the input signal 102. Further, the encoder 104 applies trellis coding to the input signal 102. The encoded signal is then applied to interleaver 106 to impose time-diversity into the encoded bitstream. The encoded, interleaved signal is then applied to modulator 108, which organizes individual bits into symbols based on the communication system characteristics and generated waveform. The transmission symbols are then applied to a linear or non-linear filter 110, which removes signal components that may be induced by switching instantaneously from one symbol to the next symbol. The symbols are applied to a Digital Up-Converter 112 to up-convert the symbols to a conventional carrier frequency, which is then band-limited by a transmit filter 114. The resulting CPM signal is then modified into a NCE-CPM signal, by an interpolator 115 which transects the unit circle between successive constellation points. The interpolator varies the complex amplitude of the signal between the constellation positions through amplification or attenuation or both. The interpolator can be implemented with hardware or software, such as a processor. The interpolator can also contain a look up table for driving the attenuator or amplifier. The up-converted NCE-CPM signal 116 is then transmitted over a wireless communication network or channel. The transmission of the NCE-CPM signal is independent of the frequency band used in the communication system and therefore is not limited to any particular frequency band. Additionally the NCE-CPM can be transmitted over an air interface in a wireless communication system or through a wired communication system.

The transmitted NCE-CPM signal 116, when received by the known CPM receiving system 101, is applied to a linear or non-linear receiver filter 118, which bandwidth matches the received signal bandwidth to the bandwidth of the transmitted signal. The received signal is applied to a Digital Down-Converter 120 and a receive filter 122. The down-converted signal is then demodulated by a demodulator 124, de-interleaved by a deinterleaver 126 and decoded by a decoder 128, in well known processes that demodulate, deinterleave and decode the received signal. Because the signal may be represented in a finite state trellis, a Viterbi algorithm or decoder may be used for recovering the modulated data. Key functions in the demodulator 124 may include but are not limited to filtering, sampling, tracking and accumulating frequency errors of a phase offset of received symbols, storing, updating subsequently transmitted symbols based on the frequency error of previously transmitted symbols, metric calculation for calculating the optimum path metrics for a received symbol or sequence of symbols, data recovery, and synchronization. The decoded output signal 130 represents an estimate of the input signal 102. In an alternative embodiment, a receiver may utilize a fixed bank of filters matched to a set of signals corresponding to an h value averaged over a finite set of modulation indices. The use of a fixed bank of filters also avoids the need to cycle banks of matched filters in synchronism with the transmitter h values. A reduced complexity receiver for the joint estimation of transmitted data, carrier phase and symbol timing may also be realized through the use of an approximate representation of the maximum likelihood function. However, a Viterbi decoder still requires knowledge of the signal deviation in use to assign the correct sequence of allowable phase transitions.

As illustrated in FIG. 2a, the transmit phase spectrum 200 of a three symbol duration prior art constant-envelope CPM signal 210 occupies the unit circle of a signal constellation. The M-ary (eight) constellation is shown with constellation points 201-208. The transmitted signal, in the example shown, moves from constellation point 201 to constellation point 202 along the unit circle 210 through arc 211. The signal then moves along the unit circle 210 to constellation point 206 through arc 212 and then moves to constellation point 203 along arc 213. The signal's complex amplitude is constant throughout the rotation to each constellation point of the signal and is represented in FIG. 2a as $R_1$, where $R_1$ equals k. The CPM transmit signal 210 has a constant envelope as the waveform rotates from symbol to symbol around the unit circle resulting from the constant radius $R_1$.

The NCE-CPM transmitted signal according to an embodiment of the present disclosure is shown in FIG. 2b for the same signal as shown above. The NCE-CPM signal 220 transects each constellation phase position through a direct path, such as a chord of the unit circle, rather than following the path described by the unit circle. The NCE-CPM transmit signal 220 transitions as the waveform shifts from symbol to symbol along a direct path which typically will have a non-constant radius as the signal travels between constellation points. This alteration in the envelope of a CPM signal occurs prior to transmission by changing, linearly or non-linearly, the amplification or attenuation of the amplifier or attenuator respectively. These variable envelope transitions may be created, for example, with selective attenuation during the shift from one constellation point to another constellation point, or by selective amplification of the signal approaching or departing from the constellation points, or both attenuation and amplification can be used during the shift. As stated previously, the application of the subject matter to communication systems is independent of frequency and can be employed in frequency hopping communication systems. The NCE-CPM signal is generated by transecting the unit circle from the present phase position to the next phase position.

In FIG. 2b, the signal transitions from constellation point 201 to successive constellation point 202 over direct path 221. The complex amplitude of the signal along direct path 221 is represented by R which is a function of θ and the position of constellation points 201 and 202. The signal then transitions to constellation point 206 along path 222 and then constellation point 203 along path 223. The interpolator 115 may determine the path using a metric based on the successive constellation points and rotation angle θ. For example, the positions of constellation points 201 and 202 are expressed in polar coordinates as $R\angle\theta_{201}$, $R\angle\theta_{202}$ specifically $k\angle 0°$, $k\angle -45°$. Using geometric properties and identities, the magnitude R between constellation points 201 and 202 can be interpolated according to:

$$R = k\left(\frac{\sin\gamma}{\sin\alpha}\right) = k\frac{\sin\left(90° - \frac{(\theta_{202} - \theta_{201})}{2}\right)}{\sin\left(90° - \theta + \frac{(\theta_{202} - \theta_{201})}{2}\right)} = k\frac{f(\theta_{202}, \theta_{201})}{f(\theta_{202}, \theta_{201}, \theta)}.$$

As shown in FIG. 2c, k is the radius of the unit circle 210 which is a function of transmitter power, θ is the rotation of the signal, and γ and α are angles of the triangle formed by tracking the path 221. The chords and thus paths between successive constellation points are a function of the constellation and may be predetermined for each combination of successive constellation points. The interpolation shown is linear, however non-linear interpolation is equally envisioned. By reducing the magnitude of the signal between the successive constellation points, the non-constant-envelope continuous waveform is generated.

Another method of interpolation converts the location of the constellation points 201 and 202 into rectilinear coordinates such that:

$(x,y)_{201} = (k \cos\theta_{201}, k \sin\theta_{201})$ $(x,y)_{202} = (k \cos\theta_{202}, k \sin\theta_{202})$ Then the number of increments N is selected, the number of increments in arbitrary and dictates the resolution of the path between the constellation positions. For Illustration only the number of increments used set at N=10. The value of the increment is determined by:

$x(\text{increment}) = (x_{202} - x_{201})/N = .(707k - 1.0k)/10 = 0.0293$ $y(\text{increment}) = (y_{202} - y_{201})/N = (-0.707 - 0.0)/10 = -0.0707$ The path proceeds from increment to increment to the next constellation point by:

$x(\text{new}) = x_{201} + x(\text{increment})$ $y(\text{new}) = y_{201} + y(\text{increment})$ and $x(\text{new}) = x(\text{new}) + x(\text{increment})$ $y(\text{new}) = y(\text{new}) + y(\text{increment})$ where the Radius or complex magnitude is given as simply the square root,:

$R(\text{new}) = \sqrt{(x(\text{new}))^2 + (y(\text{new}))^2}.$

Figure 3:
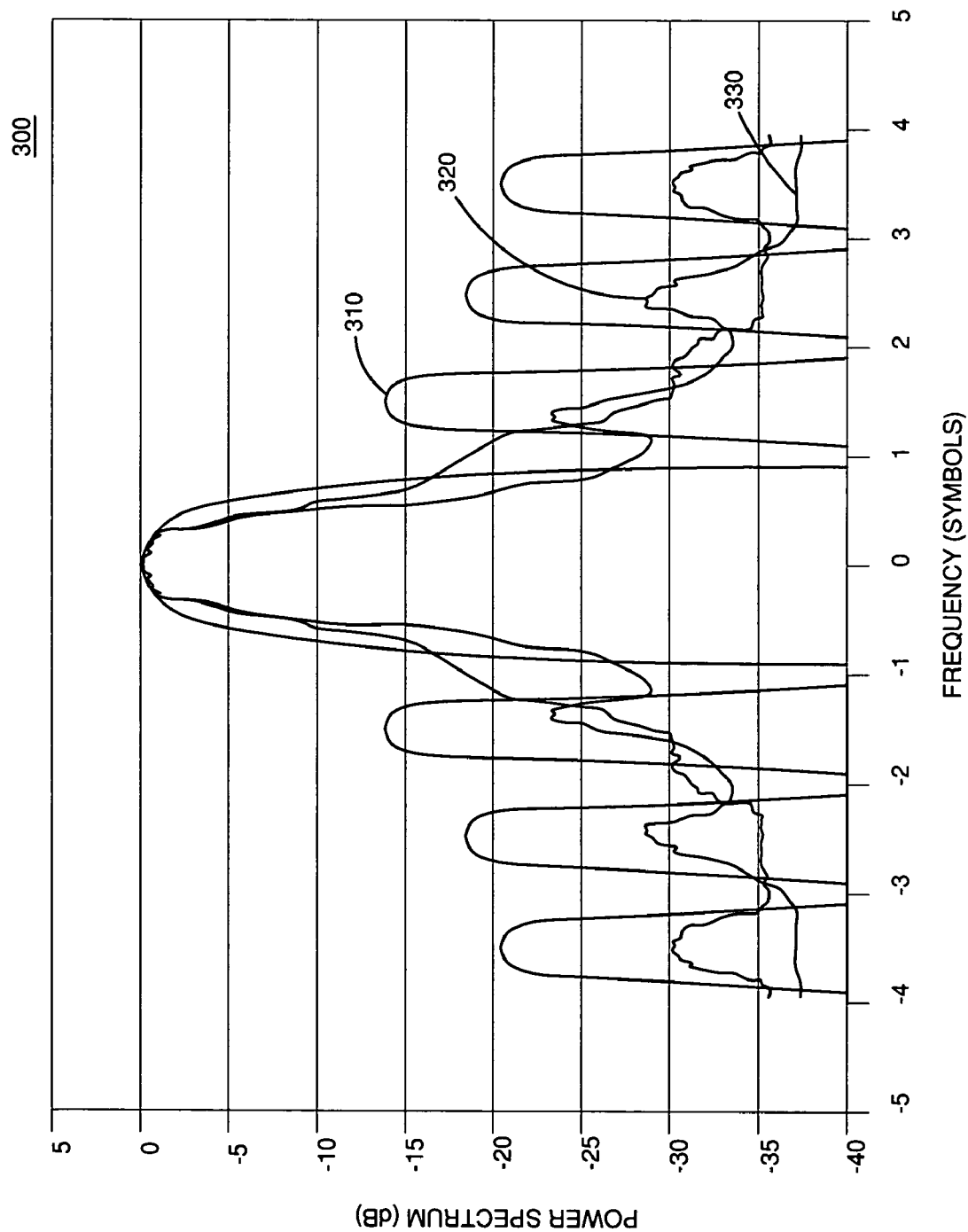
FIG. 3 is a representative bandwidth comparison chart of an NCE-CPM signal according to an embodiment of the disclosed subject matter, a standard h=4/16, 5/16 1REC CPM signal and a QPSK signal.

Several other method of interpolation using know geometric tools is equally envisioned but are not discussed herein as there are readily determined by one skilled in the art A comparison of the frequency spectrum 300 generated by the NCE-CPM signal 320 to an h=4/16, 5/16 1REC CPM transmit signal 310 and QPSK transmit signal 330 is shown in FIG. 3. The NCE-CPM signal 320 requires significantly less bandwidth than the QPSK signal 330 and the h=4/16, 5/16 1REC CPM transmit signal 310. This allows more channels to be packed into a fixed bandwidth allocation. Further improvements for the NCE-CPM spectrum may be made by increasing the length of the frequency pulse g(τ) which results in further decreasing the side-lobes of the NCE-CPM signal 320. Further, by changing the modulation index h, the spectra may also be altered. As shown, the resulting NCE-CPM spectrum 320 is reduced by twenty five percent over the standard h=4/16, 5/16 1REC CPM spectrum 310.

Figure 4:
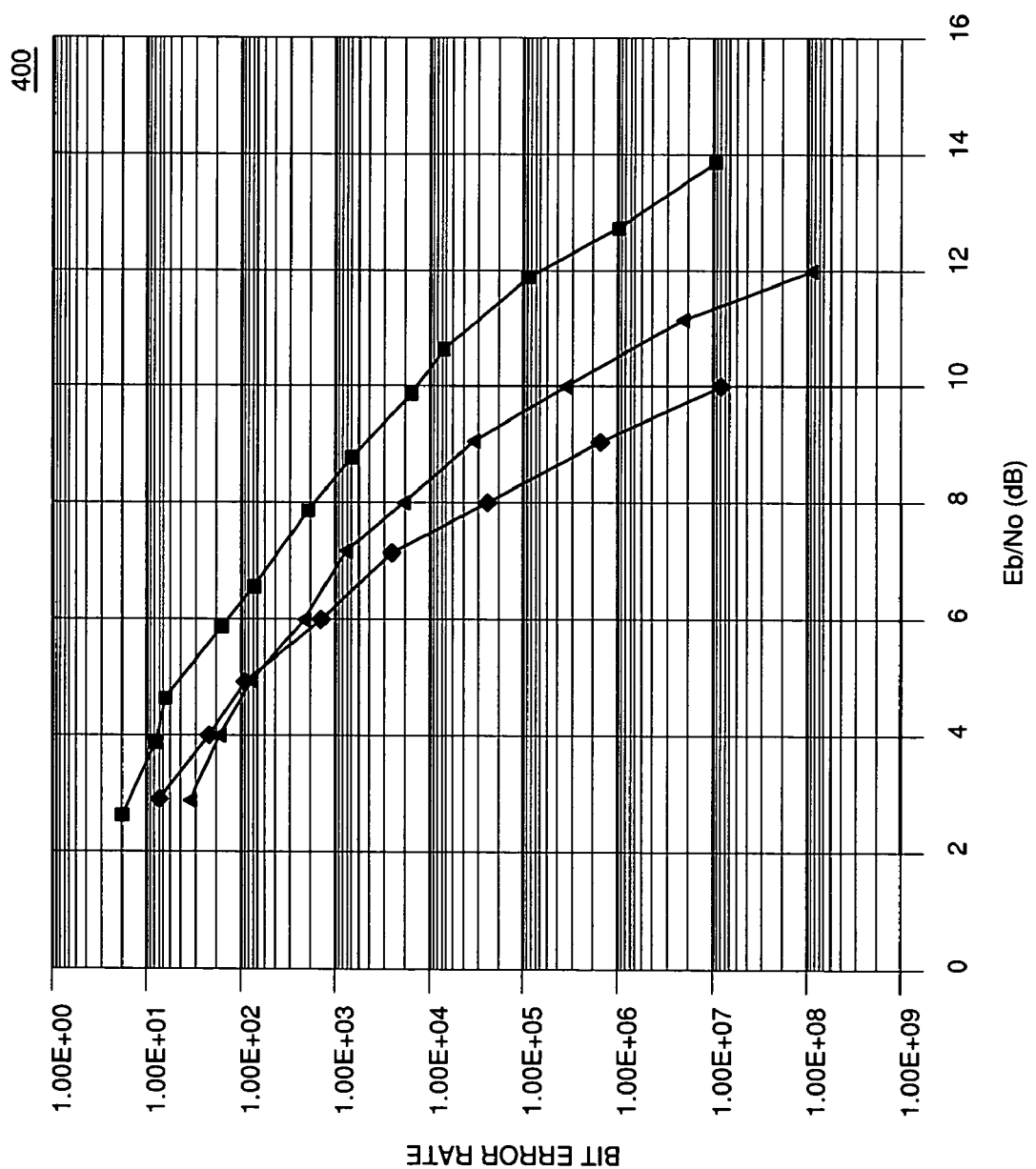
FIG. 4 is a representative comparison chart of the bit error rate (BER) performance of an NCE-CPM signal according to an embodiment of the disclosed subject matter, a standard h=4/16, 5/16 1REC CPM signal and a PSK signal.

Bit error rate (BER) performance results 400 for a theoretical PSK signal 410, an NCE-CPM signal 420 according to an embodiment of the disclosed subject matter and a standard h=4/16, 5/16 1REC CPM signal 430 are shown in FIG. 4. The NCE-CPM signal 420 represents a better case in terms of gaining bandwidth efficiency as shown in FIG. 3 while giving up as little energy per bit ($E_b N_o$) performance as possible as illustrated in FIG. 4.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

I claim:

1. A method for improving the bandwidth efficiency of a continuous phase modulation signal comprised of plural symbols over a communication channel comprising the steps of:
    coding an input data stream;
    modulating a carrier frequency with the coded input data stream as a constant envelope continuous phase modulation waveform; and
    converting the constant envelope continuous phase modulation waveform into a non-constant envelope continuous phase modulation waveform thereby improving the bandwidth of the signal,
    wherein the step of converting includes interpolation of a path between constellation points along a chord connecting successive constellation points.

2. The method of claim 1, wherein said coding is trellis coding.

3. The method of claim 1, wherein the path is a function of an angle between the successive constellation points.

4. The method of claim 1, wherein the non-constant envelope continuous phase modulation waveform has multiple modulation indices.

5. The method of claim 1 further comprising interleaving the coded input data stream thereby providing time diversity.

6. The method of claim 5 further comprising the step of filtering the non-constant envelope continuous phase modulation waveform thereby band limiting the transmission signal.

7. A method for improving the bandwidth efficiency of a constant envelope continuous phase modulated waveform signal encoded with data symbols, comprising the steps of varying a complex amplitude of the signal between successive constellation points prior to transmission and controlling the complex amplitude of the signal to follow a path between successive constellation points that is more direct than the arc of a unit circle circumscribing the constellation points.

8. The method of claim 7, wherein the signal's complex amplitude follows a chord of the unit circle connecting the successive constellation points.

9. The method of claim 7, wherein the step of varying a complex amplitude comprises the step of attenuating the signal.

10. The method of claim 7, wherein the step of varying a complex amplitude comprises the step of amplifying the signal.

11. A method of transmitting data as a non-constant envelope continuous phase modulation signal comprised of a plurality of symbols in a constellation comprising the steps of:
    coding the plurality of symbols into a plurality of CPM symbols; and
    transecting ones of said CPM symbols by a direct path during modulation of the coded plurality of symbols thereby enabling the transmission of a non-constant envelope continuous phase modulation waveform.

12. The method of claim 11, wherein the coding is trellis coding.

13. The method of claim 11, wherein the direct path is a function of the positions of successive constellation points.

14. The method of claim 11, wherein the direct path is a function of the rotation of the waveform about a unit circle.

15. The method of claim 11, wherein the non-constant envelope continuous phase modulation waveform has multiple modulation indices.

16. A method for modulating an input data stream wherein said input data stream is comprised of a plurality of symbols, said symbols represented as constellation positions in a complex plane comprising the steps of generating a continuous phase modulation waveform modulated with the plurality of symbols, and modifying the complex amplitude between the successive constellation positions to traverse the complex plane in a straight path from one of said constellation positions to another of said constellation positions.

17. The method of claim 16, wherein the input data stream is trellis coded.

18. The method of claim 16 further comprising filtering the input data stream with a pre-modulation filter to achieve proper frequency deviation.

19. The method of claim 18, wherein the filter is a non-linear filter.

20. In a constant envelope continuous phase modulation waveform communication system including a transmitter for transmitting data as continuous phase modulation symbols and a receiver with a constant envelope continuous phase modulation demodulator, the improvement comprising a conversion means for converting a constant envelope continuous phase modulation waveform into a non-constant continuous phase modulation waveform prior to transmission such that the complex amplitude of the waveform between successive constellation points is less than the complex amplitude at each of the constellation points.

21. The system of claim 20, wherein the transmitter further comprises a coder.

22. The system of claim 20, wherein the transmitter further comprises an interleaver.

23. The system of claim 20, wherein said conversion means varies the complex amplitude of the waveform as a function of positions of constellation points.

24. The system of claim 20, wherein said conversion means comprises an interpolator controlling a variable amplifier.

25. The system of claim 20, wherein said conversion means comprises an interpolator controlling a variable attenuator.

26. A method for transmitting an input data stream as phase locations in a complex plane in a continuous phase modulation waveform, comprising the steps of:
    modulating the continuous phase modulation waveform with the input data stream;
    transecting the complex plane between successive phase locations in a substantially straight path.

27. A method for communicating data comprising the steps of:
    transmitting data as a plurality of symbols within a complex plane as a continuous phase modulated waveform; and
    varying the magnitude of the waveform in the complex plane during the transition between ones of said symbols.

28. The method of claim 27, wherein said plurality of symbols are phase locations in the complex plane.

29. The method of claim 27, wherein the step of varying further comprises varying the magnitude linearly across the constellation plane.

30. The method of claim 27, wherein the magnitude of the waveform between ones of said symbols is less than the magnitude of the waveform at the symbol locations.

* * * * *